(12) United States Patent
Kim et al.

(10) Patent No.: US 8,126,315 B2
(45) Date of Patent: *Feb. 28, 2012

(54) RECORDING MEDIUM FOR CARRYING TRANSPORT TIME INFORMATION

(75) Inventors: Byung-Jin Kim, Kyunggi-do (KR); Kang-Soo Seo, Kyunggi-do (KR); Jea-Yong Yoo, Seoul (KR); Ki-Won Kang, Seoul (KR)

(73) Assignee: LG Electronics, Inc., Seoul (KR)

( * ) Notice: Subject to any disclaimer, the term of this patent is extended or adjusted under 35 U.S.C. 154(b) by 1016 days.

This patent is subject to a terminal disclaimer.

(21) Appl. No.: 11/348,451

(22) Filed: Feb. 7, 2006

(65) Prior Publication Data

US 2006/0127064 A1    Jun. 15, 2006

Related U.S. Application Data

(63) Continuation of application No. 09/635,802, filed on Aug. 11, 2000, now Pat. No. 7,020,384.

(30) Foreign Application Priority Data

Aug. 12, 1999 (KR) .................................. 99-33203
Aug. 12, 1999 (KR) .................................. 99-33204

(51) Int. Cl.
*H04N 5/84* (2006.01)
*H04N 5/89* (2006.01)

(52) U.S. Cl. ....................................................... 386/334

(58) Field of Classification Search ................ 386/1, 46, 386/65, 66, 84, 95, 109, 124–126

See application file for complete search history.

(56) References Cited

U.S. PATENT DOCUMENTS

| | | | |
|---|---|---|---|
| 5,377,051 A | 12/1994 | Lane et al. | |
| 5,535,008 A | 7/1996 | Yamagishi et al. | |
| 5,719,982 A | 2/1998 | Kawamura et al. | |
| 5,801,781 A | 9/1998 | Hiroshima et al. | |
| 5,818,547 A | 10/1998 | Ozaki | |
| 5,832,085 A | 11/1998 | Inoue et al. | |
| 5,835,668 A * | 11/1998 | Yanagihara | 386/241 |
| 5,850,501 A | 12/1998 | Yanagihara | |
| 6,021,168 A * | 2/2000 | Huh | 375/376 |
| 6,118,486 A | 9/2000 | Reitmeier | |
| 6,169,843 B1 | 1/2001 | Lenihan et al. | |
| 6,181,872 B1 | 1/2001 | Yamane et al. | |
| 6,211,800 B1 | 4/2001 | Yanagihara et al. | |
| 6,373,856 B1 | 4/2002 | Higashida | |
| 6,460,097 B1 | 10/2002 | Harumoto et al. | |
| 6,466,735 B1 * | 10/2002 | Kozuka et al. | 386/353 |
| 6,467,093 B1 * | 10/2002 | Inoue et al. | 725/151 |

(Continued)

FOREIGN PATENT DOCUMENTS

CN    1221284 C    6/1999

(Continued)

*Primary Examiner* — William C Vaughn, Jr.
*Assistant Examiner* — Eileen Adams
(74) *Attorney, Agent, or Firm* — Birch, Stewart, Kolasch & Birch, LLP (57) ABSTRACT

A recording medium according to an embodiment includes a recording layer and a transport stream recorded on the recording layer. The transport stream is composed of one or more predetermined units, each predetermined unit starting with at least one transport packet for carrying navigation information used to manage subsequent transport packets. The first packet of the at least one transport packet carries only the navigation information including program clock reference (PCR) information and does not carry presentation data.

21 Claims, 12 Drawing Sheets

U.S. PATENT DOCUMENTS

| | | | |
|---|---|---|---|
| 6,567,409 B1 * | 5/2003 | Tozaki et al. | 370/395.64 |
| 6,580,869 B1 | 6/2003 | Ando et al. | |
| 6,618,549 B1 | 9/2003 | Kato et al. | |
| 6,754,273 B1 | 6/2004 | Sackstein et al. | |
| 6,782,189 B2 | 8/2004 | Ando et al. | |
| 6,792,198 B1 | 9/2004 | Kim et al. | |
| 6,865,747 B1 | 3/2005 | Mercier | |
| 6,901,078 B2 | 5/2005 | Morris et al. | |
| 7,020,384 B1 * | 3/2006 | Kim et al. | 386/95 |
| 7,088,911 B2 | 8/2006 | Himeno et al. | |
| 7,302,166 B2 * | 11/2007 | Date et al. | 386/95 |
| 2002/0118953 A1 | 8/2002 | Kim | |
| 2003/0189879 A1 | 10/2003 | Ishii et al. | |
| 2004/0081435 A1 | 4/2004 | Maehashi et al. | |

FOREIGN PATENT DOCUMENTS

| | | |
|---|---|---|
| EP | 0 863 669 A1 | 9/1998 |
| EP | 0 917 355 A1 | 5/1999 |
| JP | 6-178288 A | 6/1994 |
| JP | 8-140043 A | 5/1996 |
| JP | 11-45512 A | 2/1999 |
| JP | 11-261963 A | 9/1999 |
| KR | 10-1998-040115 A | 8/1998 |
| KR | 1998-065230 | 10/1998 |
| KR | 10-1999-0045329 A | 6/1999 |
| KR | 10-0252108 B1 | 1/2000 |
| KR | 10-2000-0026049 A | 5/2000 |
| WO | WO-00/30358 | 5/2000 |
| WO | WO 01/20826 A1 | 3/2001 |

* cited by examiner

FIG. 1

Conventional Art

FIG. 2

Conventional Art

FIG. 3

Conventional Art

FIG. 4

*Conventional Art*

RECORDING MEDIUM FOR CARRYING TRANSPORT TIME INFORMATION

The present application is a continuation of application Ser. No. 09/635,802 filed on Aug. 11, 2000 now U.S. Pat. No. 7,020,384 (now allowed), the entire contents of which are herein fully incorporated by reference. The present application also claims the priority benefit of Korean Patent Application Nos. 99-33203 and 99-33204 filed on Aug. 12, 1999 in Republic Korea.

BACKGROUND OF THE INVENTION

1. Field of the Invention

The present invention relates to a method for creating and recording transport time information to be used as time references when transmitting data transport packets recorded in the format of a transport stream in a disk recording medium such as a high-density digital versatile disk (HDVD) to a connected equipment such as a digital television, and a method for transmitting data transport packets on time indicated by the recorded transport time information while reproducing recorded data stream. The present invention also relates to a recording medium embodying information used in these methods.

2. Description of the Related Art

Figure 1:
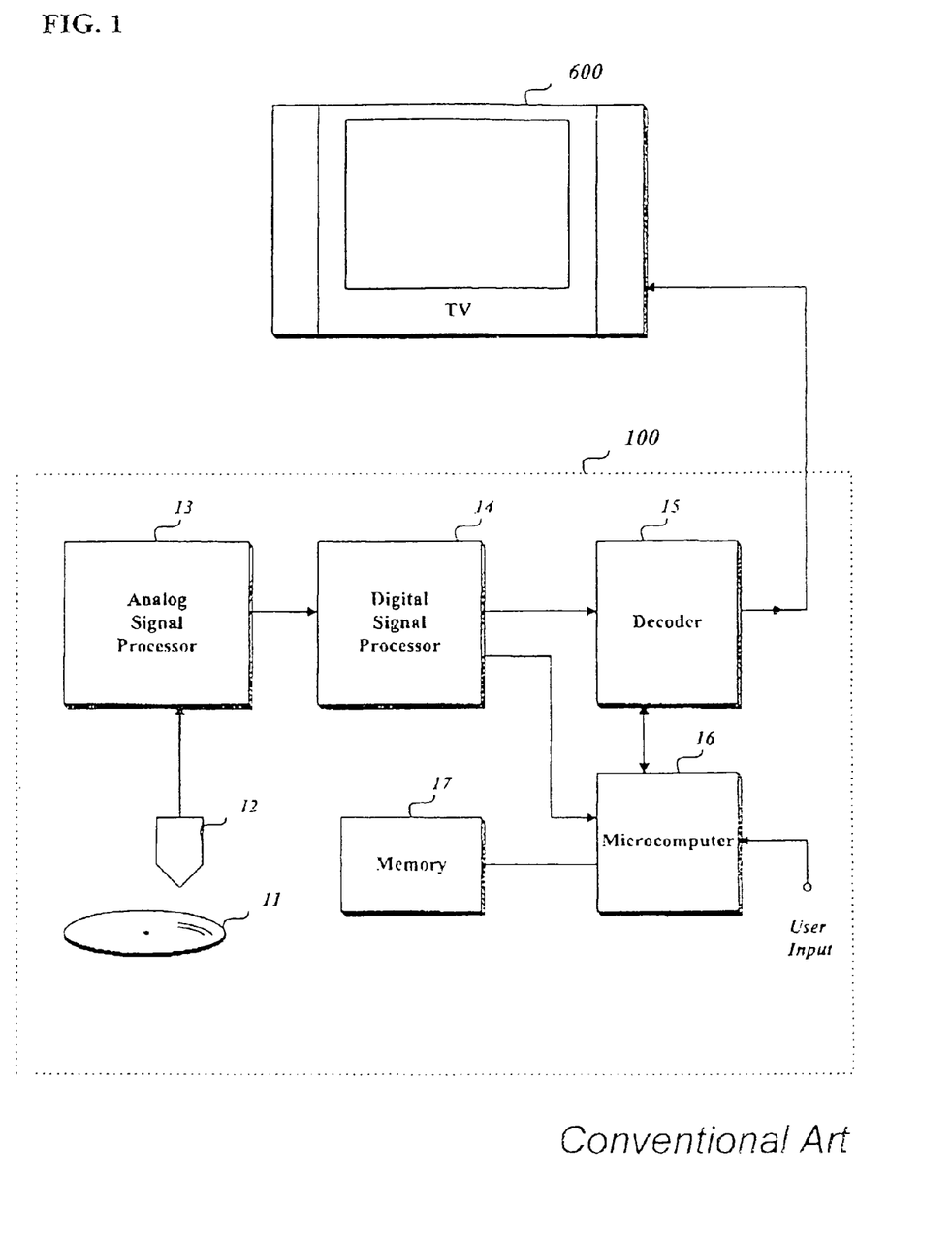
FIG. 1 is a block diagram of a digital versatile disk player and a general television which are connected each other.

FIG. 1 is a block diagram of a DVD player and a general television which are connected each other. The DVD player 100, which reproduces video and audio data recorded in a disk recording medium such as a DVD-ROM, comprises an optical pickup 12 for detecting signals recorded in a disk 11 such as a DVD-ROM; an analog signal processor 13 for converting the detected high-frequency signals into binary signals; a digital signal processor 14 for processing the binary signals into a program stream (PS) of MPEG standard; a decoder 15 for decoding the data contained in the PS into non-compressed video and audio data and converting them into corresponding analog signals to be applied to the general television 600; a microcomputer 16 controlling operations of the above elements for data reproduction; and a memory 17 for temporally storing data produced while reproduction.

The DVD player 100 configured as FIG. 1 decodes and converts data in the PS reproduced from the disk 11 such as a DVD-ROM into analog video and audio signals, and then applies them to the conventional television 600 for video and audio presentation.

Figure 2:
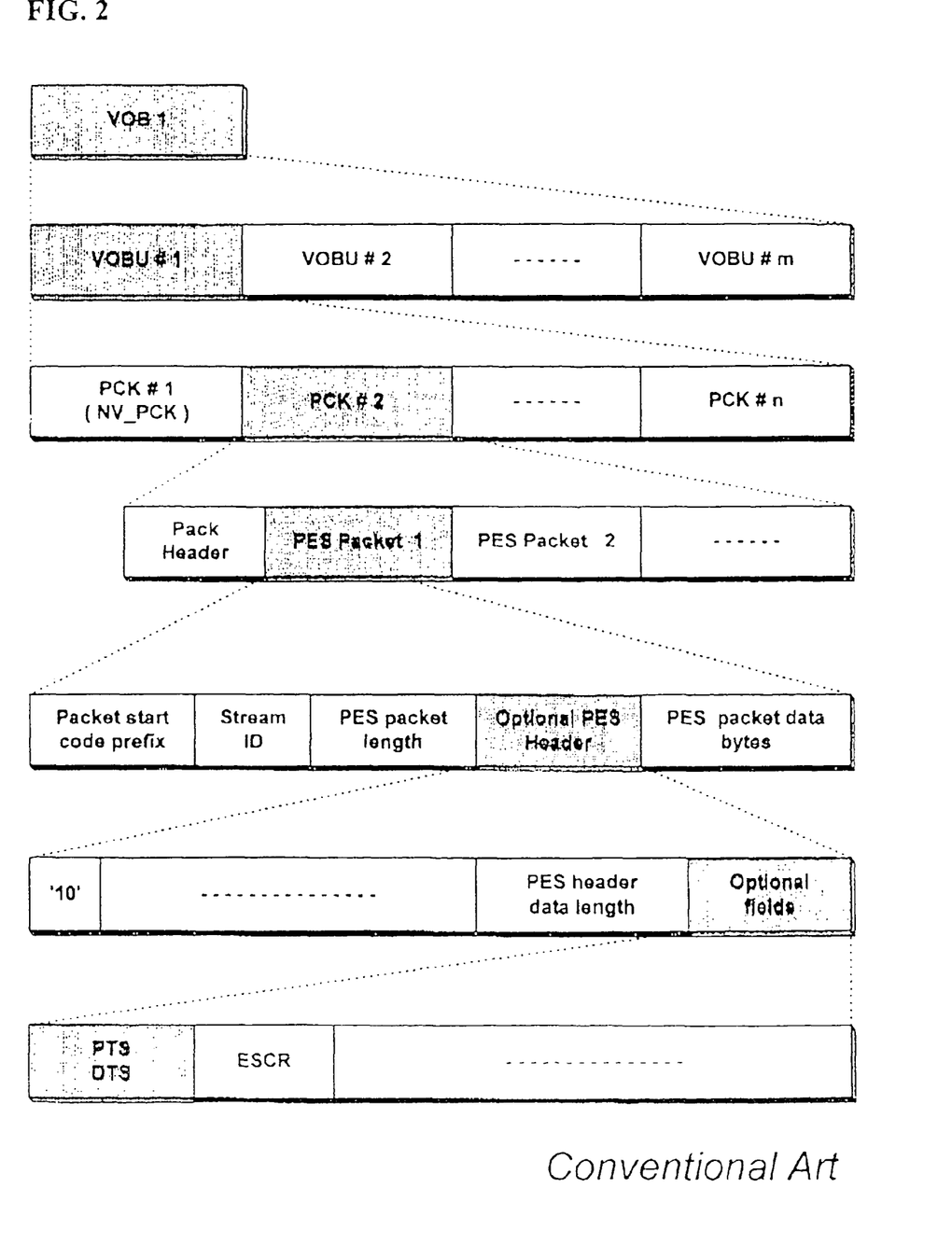
FIG. 2 shows a hierarchical structure of a recorded data stream and time information, especially the presentation timestamp and decoding timestamp, recorded in a read-only disk such as a DVD-ROM.

FIG. 2 shows a hierarchical structure of a recorded data stream and time information, especially the presentation timestamp (PTS) and decoding timestamp (DTS), recorded in a read-only disk such as a DVD-ROM.

As shown in FIG. 2, one or more video objects (VOBs) are recorded in a read-only DVD during disk manufacturing. A single VOB is corresponding to a single title or program and is composed of many video object units (VOBUs). A single VOBU is composed of a navigation pack and several data packs. Each data pack consists of a pack header and several program elementary stream packets (PESPs) which contains respective a PES header in which the PTS and DTS information are written.

The audio/video data stream retrieved from the PESPs is decoded on time indicated by the DTS information and then temporarily stored in a memory or a buffer, and outputted to a speaker and a screen of the general television 600 on time indicated by the PTS information.

That is, the point of time when to convert the audio and video data stream reproduced from a read-only DVD is determined based on the DTS and PTS written in the PES header of each PESP, so that the converted analog real audio and video signals can be presented to a viewer through a speaker and a screen of a general television without any discontinuity.

Figure 3:
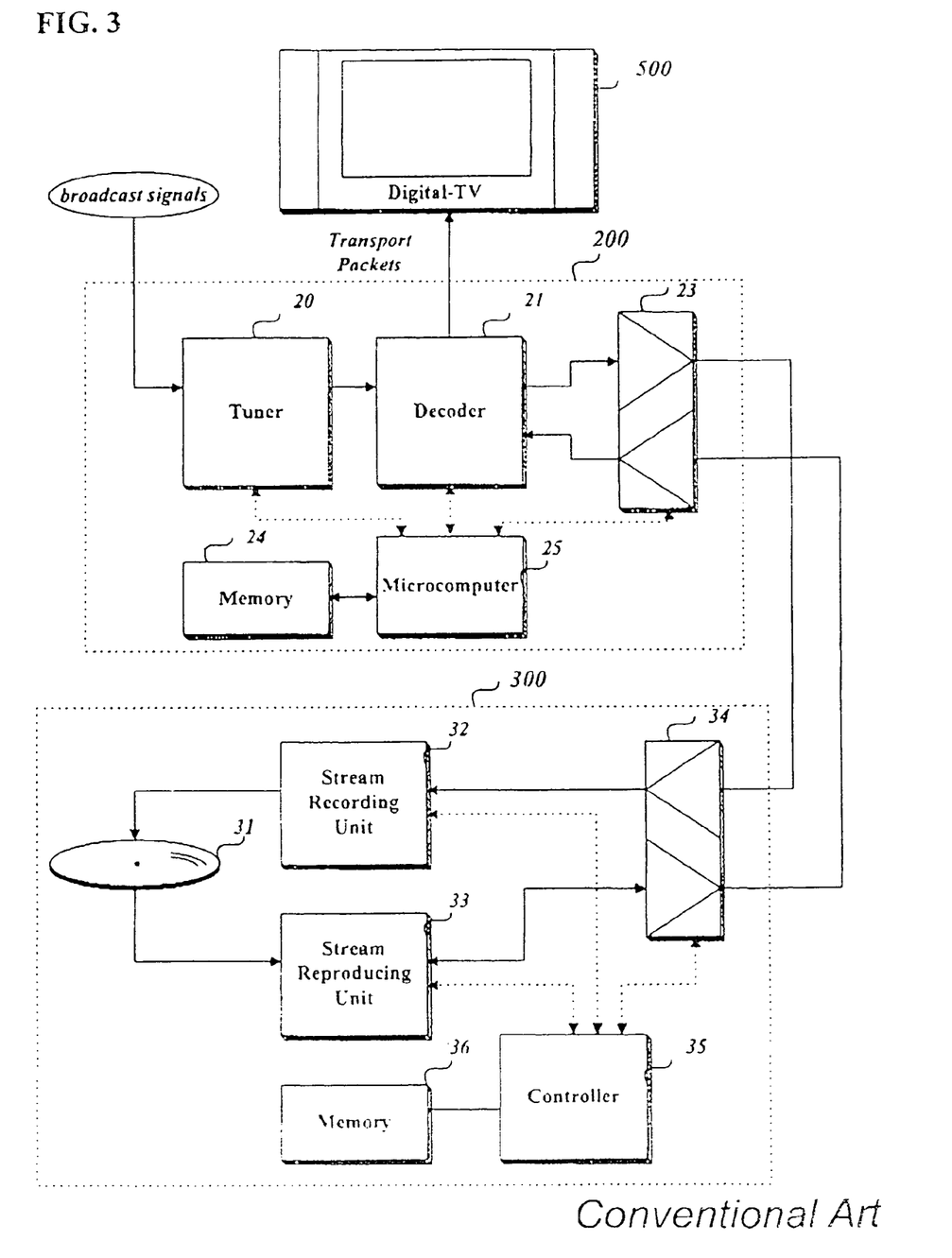
FIG. 3 shows an example of several electric home appliances connected each other through a digital interface such as the IEEE 1394 standard.

FIG. 3 shows an example of several electric home appliances connected each other through a digital interface such as the IEEE 1394 standard. The electric home appliances connected each other are a digital television (TV) 500; a set top box (STB) 200 for receiving RF broadcast signals, extracting a data stream belonging to a selected program from the broadcast signals, and transmitting the extracted stream to the digital TV 500; and a streamer 300 recording or reproducing a digital data stream to/from a rewritable digital versatile disk (DVD-RAM).

The streamer 300 comprises a stream recording unit 32 for recording transport packets, which constitutes a transport stream (TS) for a digital broadcast program, transmitted from the STB 200 connected through the IEEE 1394 standard in a rewritable DVD 31; a stream reproducing unit 33 for reproducing the TS recorded in the rewritable DVD 31; an interface unit 34 for transmitting the reproduced TS to the STB 200 and receiving a data stream from the STB 200 through the IEEE 1394 standard; a controller 35 for controlling the operations of the above elements; and a memory 35 storing data necessary for the control operation of the controller 35.

The streamer 300 configured as above records a digital data stream of broadcast programs received from the STB 200 in a rewritable DVD in a pre-specified format, or divides a data stream reproduced from the rewritable DVD into transport packets and then transmits them to the STB 200 through the IEEE 1394 standard.

The STB 200 transmits the received transport packets to the digital TV 500, then the digital TV 500 decodes the transport packets to present high-quality video and audio. Such operations make it possible to record digital broadcast programs and reproduce them.

Figure 4:
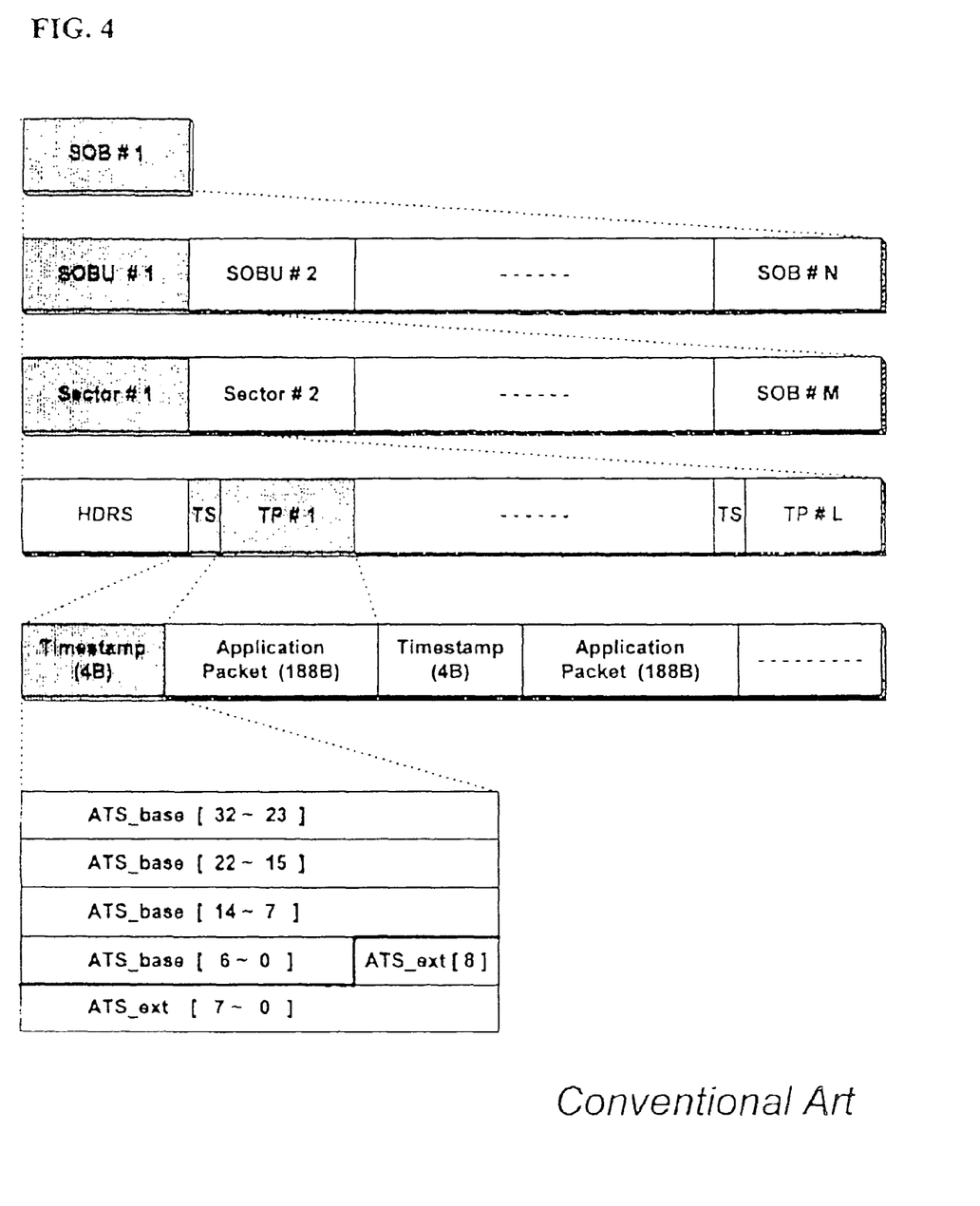
FIG. 4 is a pictorial representation showing a hierarchical structure of a data stream recorded in the rewritable DVD and packet arrival time information recorded in each transport packet.

FIG. 4 is a pictorial representation showing a hierarchical structure of a data stream recorded in the rewritable DVD and packet arrival time (PAT) information recorded in each transport packet (TP).

As shown in FIG. 4, one or more stream objects (SOBs) are recorded in a rewritable DVD. A single SOB is composed of many stream object units (SOBUs). Partial stream belonging to a single SOBU is written across several fixed-size sectors. Header information and several TPs are written in each sector.

The streamer 300 adds 4-byte PAT to each TP as shown in FIG. 4 when recording the received data stream. The 4-byte PAT consists of a 9-bit arrival timestamp (ATS) extension marked as 'ATS_ext' and a 39-bit arrival timestamp base marked as 'ATS_base' according to the MPEG standard. The arrival time extension is a modulo-300 counter that is incremented at a rate of 27 MHz, whereas the arrival time base is incremented at a rate of 90 KHz.

The reason of recording the PAT in each packet as explained above is to transmit recorded packets at same interval which transport packets are received at, and to use the recorded PAT as a position index when searching for the video data, especially the infra-coded picture data recorded in the rewritable DVD. The reason why the position index is necessary is to point the starting point of each infra-coded video frame since the starting point may be located anywhere in a SOBU when the broadcast program is recorded as it is received. The position index is used to jump quickly between infra-coded video frames while a trick play is conducted.

For a recording format for a under-developing read-only HDVD, it may be considered to adopt the TS as the recording-format in consideration that a data stream reproduced from a HDVD-ROM is delivered directly to a digital TV which accepts TS-formatted data.

The HDVD-ROM is not for recording arbitrary broadcast programs but for providing a permanently-recorded program, so that a recorded stream can be divided into many high-density object units (HOBUs) when a HDVD-ROM is manufactured in order that each HOBU may be corresponding to a GOP unit of the MPEG standard.

Each GOP unit always has a infra-coded picture at its leading part, therefore, it is possible to make a trick-play by reproducing infra-coded pictures only by jumping to each HOBU whose position can be known from navigation information read at initial loading of a disk. That is, it is not required to access into transport packet layer, which means that it is not necessary to record PATs like as a REWRITABLE DVD to search for every infra-coded pictures for a trick play.

However, each transport packet should be transmitted at time interval specified when a program is recorded into a read-only disk to be presented without discontinuity or delay, therefore, time reference information to use as point of time when to transmit each packet is still required for a read-only disk.

However, if such time reference information is written in every transport packet for a HDVD-ROM, the space for program data may be remarkably decreased.

Accordingly, a method for recording time information to use as a packet sending time reference without decreasing program recording area should be developed urgently.

SUMMARY OF THE INVENTION

It is an object of the present invention to provide a method for creating and recording transport time information of data recorded in a high-density disk recording medium, which uses a program clock reference (PCR) inserted intermittently in transport packets as a transport time reference of a packet, or creates transport time reference information for a transport packet every data recording unit accommodating several transport packets, writes the created transport time reference information in the corresponding data recording unit, and uses the written information as a time reference for transmitting the transport packet belonging to a corresponding data recording unit.

It is another object of the present invention to provide a recording medium carrying navigation information, which addresses the limitations and disadvantages associated with the related art.

A method for creating and recording transport time reference information for a disk recording medium according to an aspect of the present invention records transport time reference information for an arbitrary transport packet in a recording unit such as a pack in the header of the pack or in the header of the arbitrary packet while grouping several transport packets into a pack when recording a program in the form of a transport packet, and, when reproducing a recorded program, detects a transport time reference based on the information recorded in the header of a pack or an arbitrary transport packet, and then transmits the arbitrary transport packet at the detected time reference.

Also, the method for creating and recording transport time reference information for a high-density disk recording medium according to another aspect of the present invention specifies a fixed-positioned, for example the first transport packet to include time information for a transport time reference, and records the transport time reference information in the header of the fixed-positioned transport packet or a pack, and, when reproducing recorded transport packets, transmits the fixed-positioned transport packet at time interval according the time information for that packet.

According to another aspect of the present invention, there is provided a computer-readable recording medium comprising: a recording layer; and a transport stream recorded on the recording layer, the transport stream being composed of one or more predetermined units, each predetermined unit starting with at least one transport packet for carrying navigation information used to manage subsequent transport packets, wherein a first packet of the at least one transport packet carries only the navigation information including program clock reference (PCR) information for controlling timing associated with the transport stream and does not carry presentation data.

According to another aspect of the present invention, there is provided a computer-reable recording medium comprising: a recording layer; and a transport stream recorded on the recording layer, the transport stream being composed of at least one stream part, each stream part including a navigation packet at a head of the stream part and at least one data packet, the navigation packet carrying navigation information used to manage the at least one data packet, the navigation information including program clock reference (PCR) information for controlling timing associated with the transport stream.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENTS

In order that the invention may be fully understood, preferred embodiments thereof will now be described with reference to the accompanying drawings.

Figure 5:
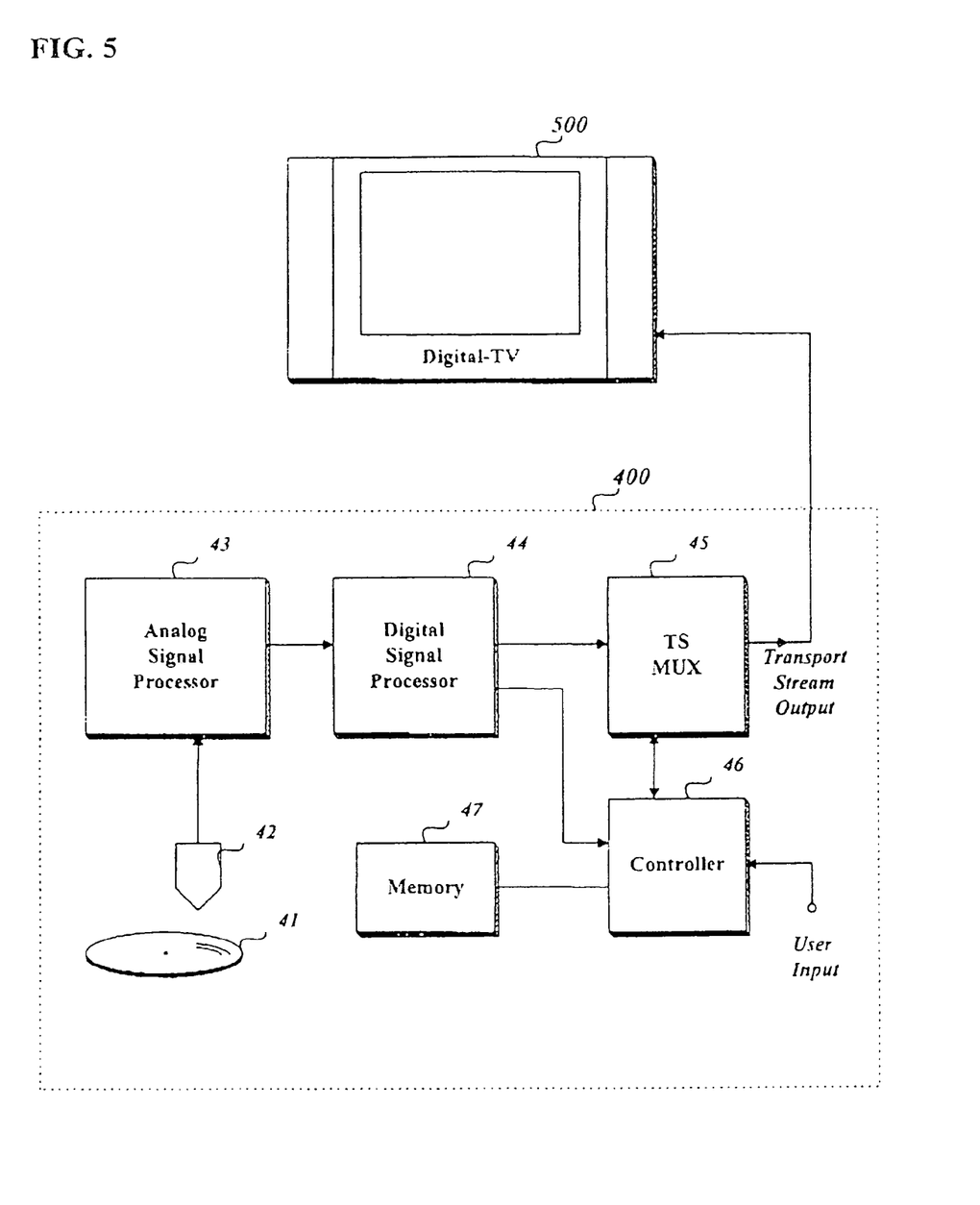
FIG. 5 is a block diagram of a high-density DVD player and a digital television to which a method for creating and recording transport time reference information according to the present invention is applied.

FIG. 5 is a block diagram of a HDVD player 400 and a digital television 500 which are connected each other. The HDVD player 400, which reproduces video and audio data recorded in a HDVD-ROM 41, comprises an optical pickup 42 for detecting signals recorded in the ROM disk 41; an analog signal processor 43 for converting the detected high-frequency signals into binary signals; a digital signal processor 44 for processing the binary signals to restore them into a digital data stream; a TS MUX 45 for extracting transport packets from the restored data stream; and a controller 46 for controlling the data reproduction and data processing timing of each element.

The HDVD player 400 configured as FIG. 5 reproduces recorded data from the HDVD-ROM 41, extracts transport packets from reproduced data, and transmits the extracted transport packets to the digital TV 500 on time specified for each packet. The digital TV 500 decodes the received packets to present them to a viewer immediately after receiving them.

Figure 6:
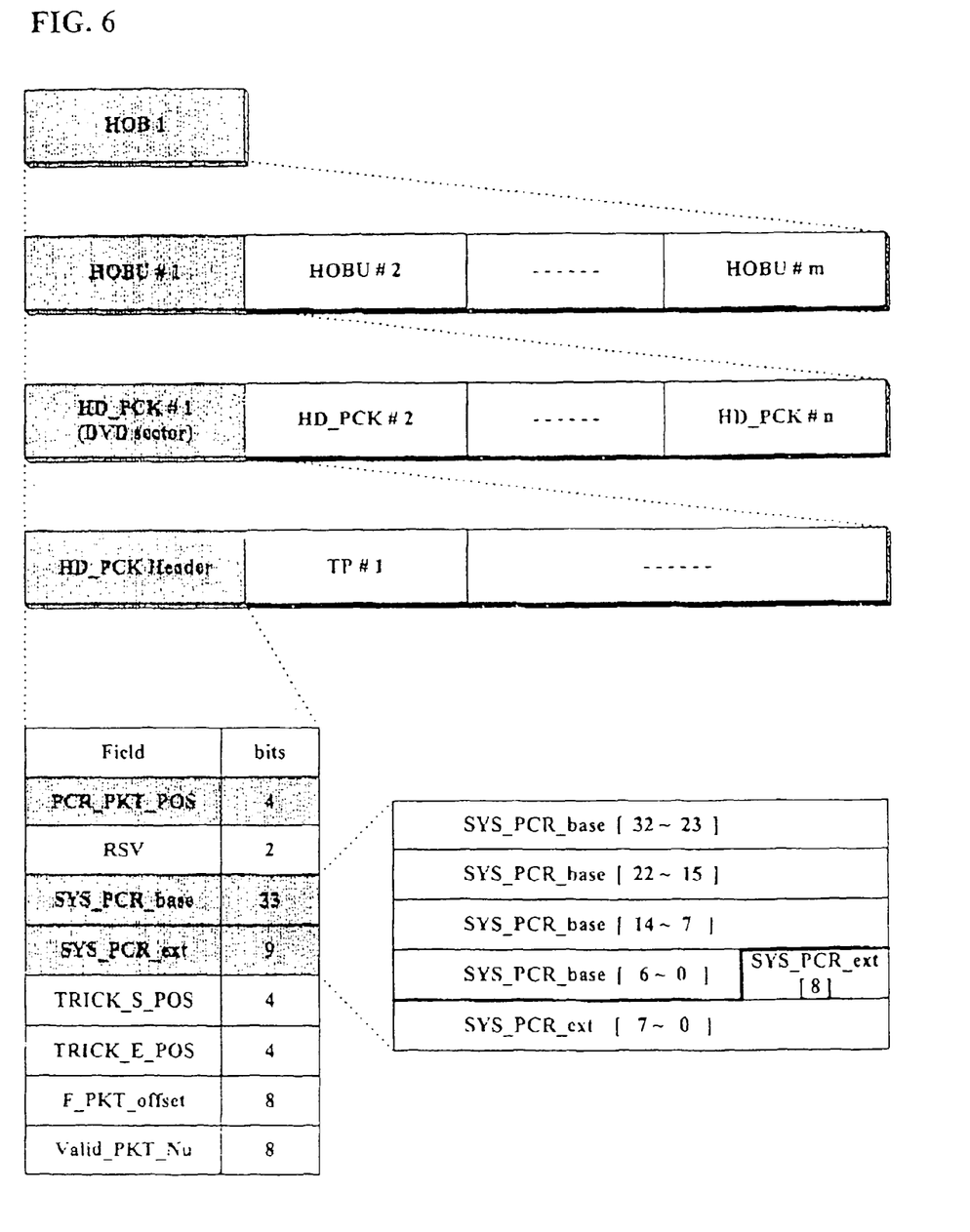
FIG. 6 shows a hierarchical data structure and a recording example of transport time reference information for a data stream recorded in a HDVD-ROM according to the present invention.

The data stream recorded in the HDVD-ROM 41 has a hierarchical data structure as shown in FIG. 6, and it has transport time reference information, of which format is also shown in FIG. 6, for transmitting transport packets to the digital television 500 at time reference difference interval which should be satisfied for continuous data presentation.

The hierarchical structure and the data syntax of FIG. 6 are explained in detail.

As shown in FIG. 6, one or more high-density video objects (HOBs) are recorded in a HDVD-ROM in a format of transport stream during manufacturing the ROM disk. A single HOB corresponds to a single title or program and is composed of many high-density object units (HOBUs). A single HOBU is composed of several packs marked as 'HD_PCK' and always contains at least a GOP unit, which always has infra-coded picture at its head part, of the MPEG standard. Each pack includes a pack header, which contains management information for transport packets written in that pack, and several or a plurality of transport packets.

The management information recorded in the pack header includes the transport time reference information for recorded packets, and the transport time reference information is same with the PCR in both of format and function. The PCR is specified in the digital broadcast standard to be inserted in transport packets more than once during a few milliseconds in order that a data presenting machine such as a digital TV may adjust a local clock, which is used as a time reference on when to present received packets, synchronously with a program source clock of a broadcast station broadcasting TP-formatted programs. Accordingly, same as the PCR, the transport time reference information is written in transport packets every a few milliseconds which is specified in a digital broadcast standard when a program (or a title)-containing HDVD-ROM is manufactured.

The format of the transport time reference information to be recorded in the pack header consists of a 9-bit extension time 'SYS_PCR_ext' and a 39-bit base time 'SYS_PCR_base' according to the MPEG standard. The extension time 'SYS_PCR_ext' is a modulo-300 counter that is incremented at a rate of 27 MHz, whereas the base time 'SYS_PCR_base' is incremented at a rate of 90 KHz.

Figure 7:
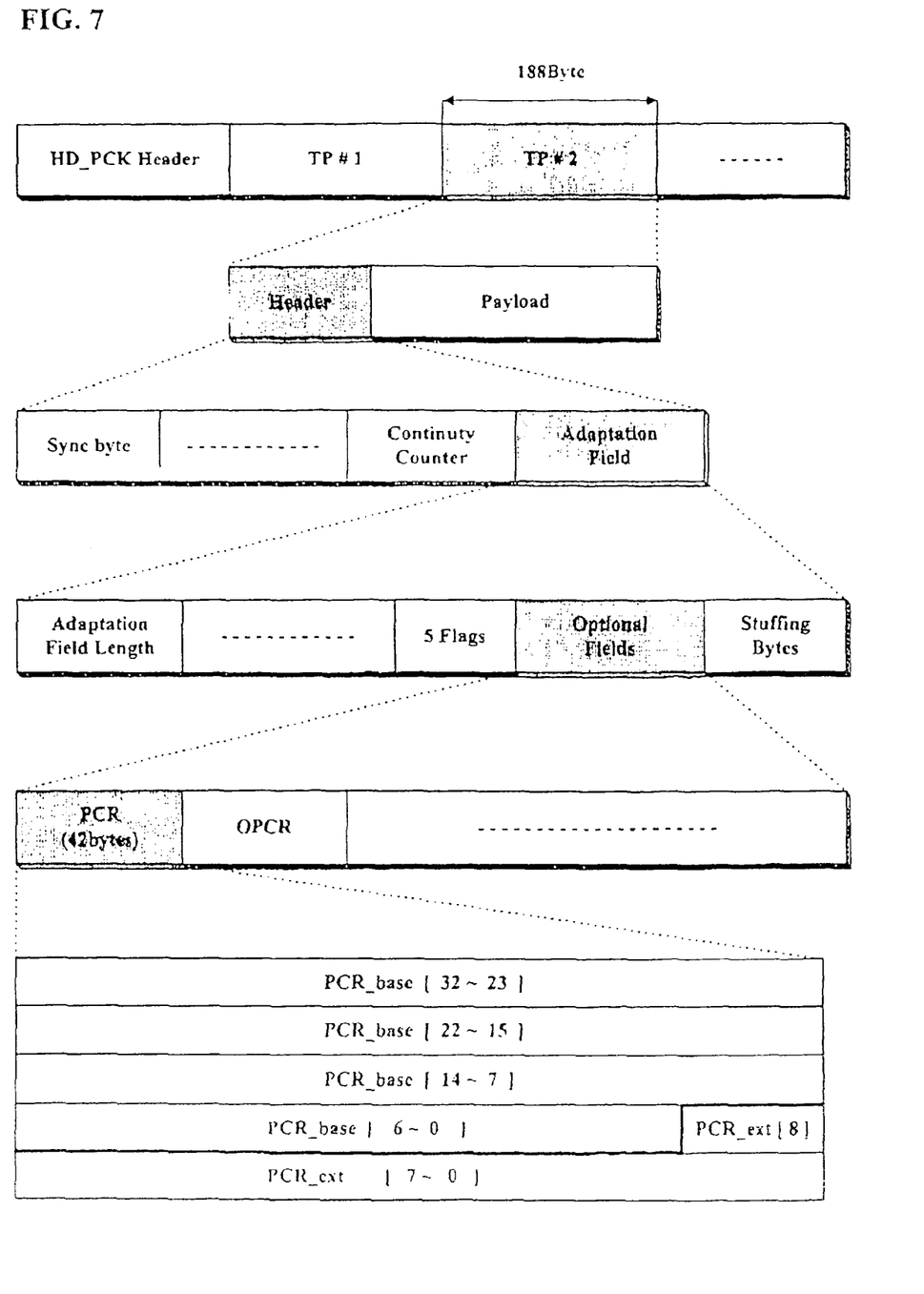
FIG. 7 shows the recording position of a program clock reference (PCR) which is intermittently recorded in transport packets.

Whereas, the recording position to write PCR which can be used as a transport time reference is the optional field shown in FIG. 7. The optional field is optionally contained in the header of a transport packet.

Figure 8:
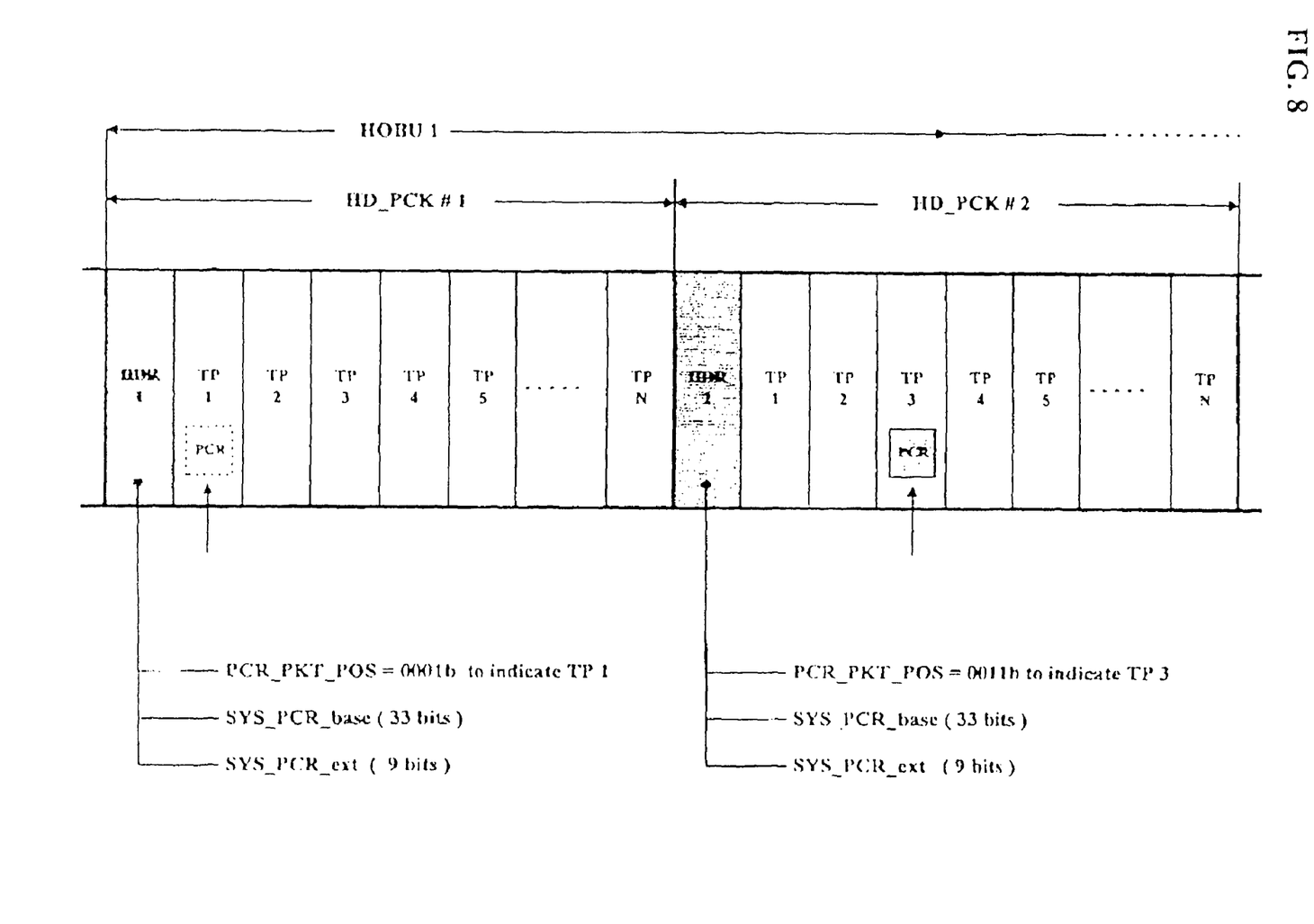
FIG. 8 is an example of transport time reference information recorded according to the present invention.

FIG. 8 is an example of transport time reference information recorded according to the present invention. If a PCR is recorded in the header of the first transport packet TP1 contained in the first pack HD-PCK #1 when a HDVD-ROM is manufactured, the location of the transport packet in which the PCR is recorded is checked and then the value of 0001b indicating the location of the first PCR-containing packet is written in the packet location field 'PCR_PKT_POS'. After that, the value of the recorded PCR is copied into the transport time reference information fields 'SYS_PCR_base' and 'SYS_PCR_ext' of the first pack header.

And if a PCR is recorded in the header of the third transport packet TP3 for the second pack, the location is checked and then the value of 0011b for the third packet is written in the packet location field 'PCR_PKT_POS' of the second pack header. After that, the value of the PCR recorded in the third transport packet TP3 is also copied into the transport time reference information fields 'SYS_PCR_base' and 'SYS_PCR_ext'.

Accordingly, when the HDVD player 400 reproduces such-recorded HDVD-ROM, the reproduced signals are restored into digital data containing location information and transport time reference information by the digital signal processor 44. The controller 46 detects both of the location information for a PCR-recorded packet and transport time reference information from the fields 'PCR_PKT_POS' 'SYS_PCR_base', and 'SYS_PCR_ext' of the pack header, checks respective values, identifies the a PCR-recorded packet from the detected location information, and delivers the identified transport packet to the digital TV 500 through applying it to the TS MUX 45 on time indicated in the transport time reference information of 'SYS_PCR_base' and 'SYS_PCR_ext'.

The transport packets, which do not have transport time reference information, are transmitted at each equally-divided time between the PCR-contained packets.

Accordingly, the HDVD player 400 can transmit recorded transport packets on time without parsing reproduced data to the level of a transport packet, that is, without decoding the contents of a transport packet.

The digital TV 500 compensates its own clock speed based on every the PCR difference value between two PCR-contained transport packets, and presents audio and video signals after determining the presentation time of the received transport packets based on the compensated self clock, thereby conducting video and audio presentation with no discontinuities.

If there is no transport packet to record PCR in a certain pack, the time reference to send the first transport packet TP1 of the pack is recorded in the transport time reference information fields 'SYS_PCR_base' and 'SYS_PCR_ext' instead of a PCR, and the value of 0000b is recorded in the packet location field 'PCR_PKT_POS' of the pack. Accordingly, the HDVD player 400 can obtain transport time references more often compared with the PCR-only recording embodiment when reproducing such-recorded HDVD-ROM, thereby adjusting the transport time interval between transport packets more accurately.

Figure 9:
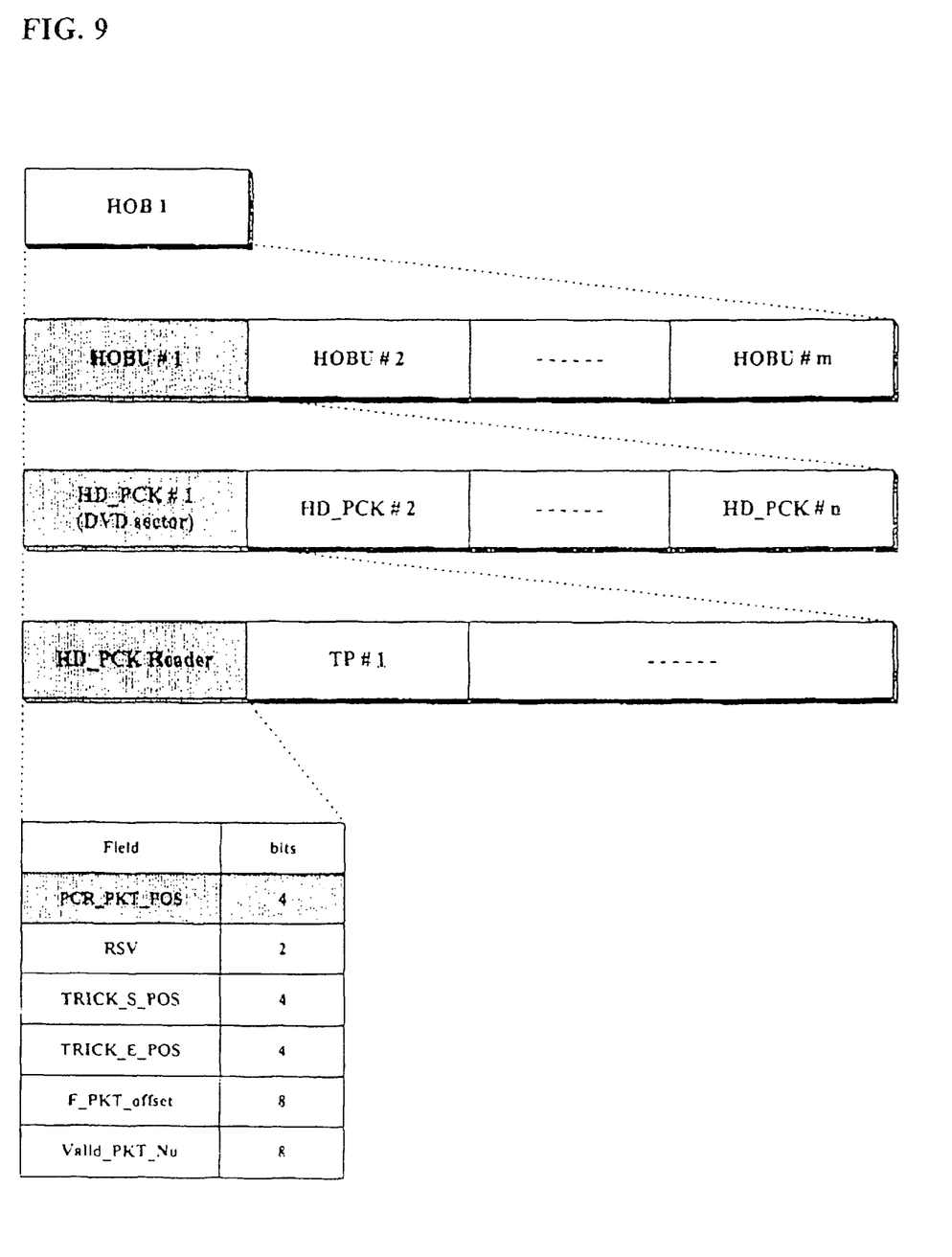
FIGS. 9 and 10 show another embodiment for creating and recording transport time reference information according to the present invention.
Figure 10:
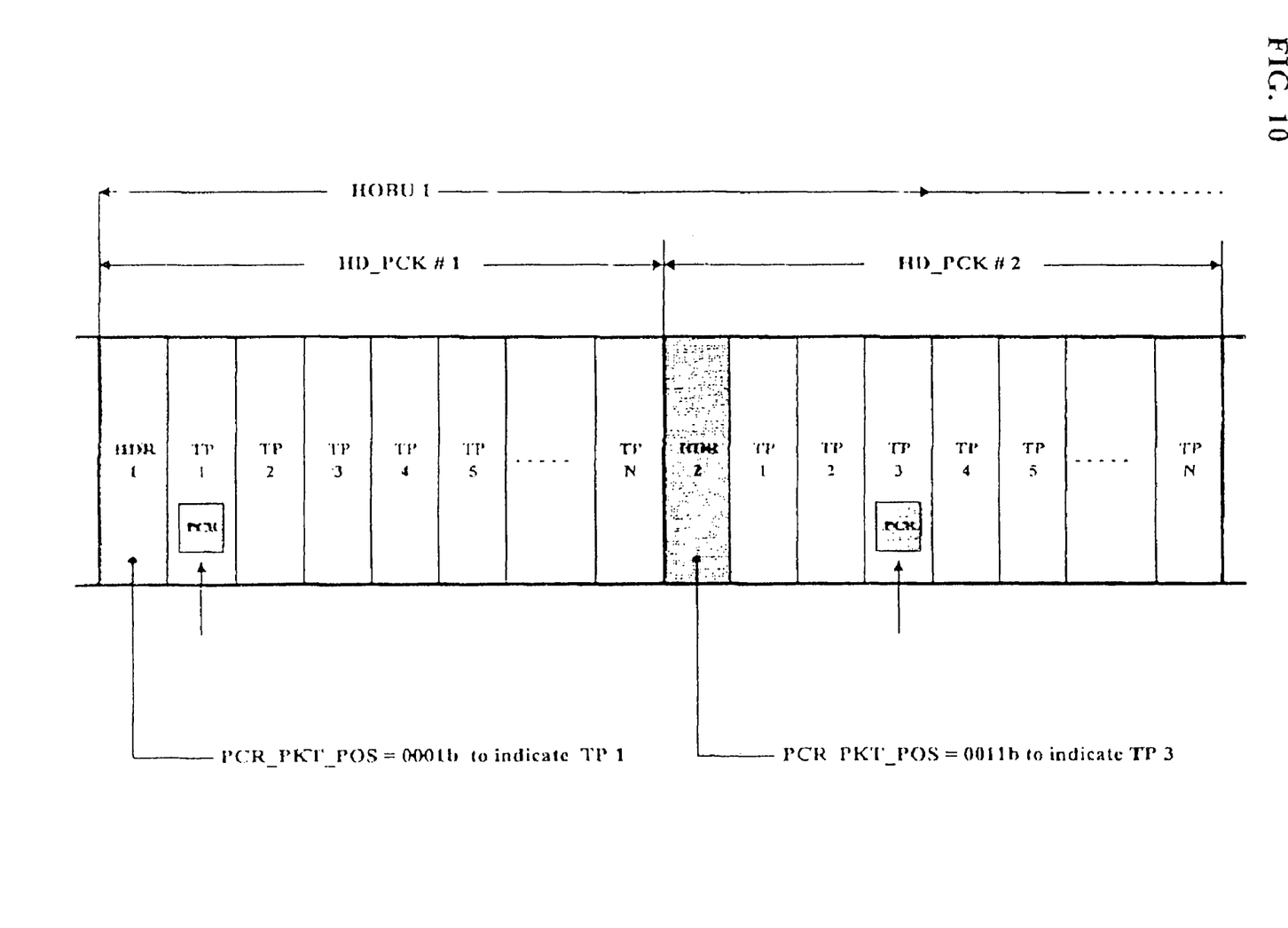

FIGS. 9 and 10 show another embodiment for creating and recording transport time reference information according to the present invention, which records the location information only for PCR-containing transport packets in the packet location field 'PCR_PKT_POS'. Where a PCR is recorded in the first transport packet TP1 of the first pack HD_PCK #1 and in the third transport packet TP3 of the second unit pack HD_PCK #2, the value 0001b for the first location is recorded in the packet location field of the first pack header, and the value 0011b for the third location is recorded in the applicable field of the second pack header.

Accordingly, when the HDVD player 400 reproduces such-recorded HDVD-ROM, the controller 46 searches for the PCR-contained transport packet indicated by the packet location field 'PCR_PKT_POS' of the pack header, reads out the PCR contained in the found packet, and uses the read PCR as a transport time reference for transmitting the found packet. In this embodiment, the controller 46 refers to the information of the TP header by decoding to the transport packet level.

Figure 11:
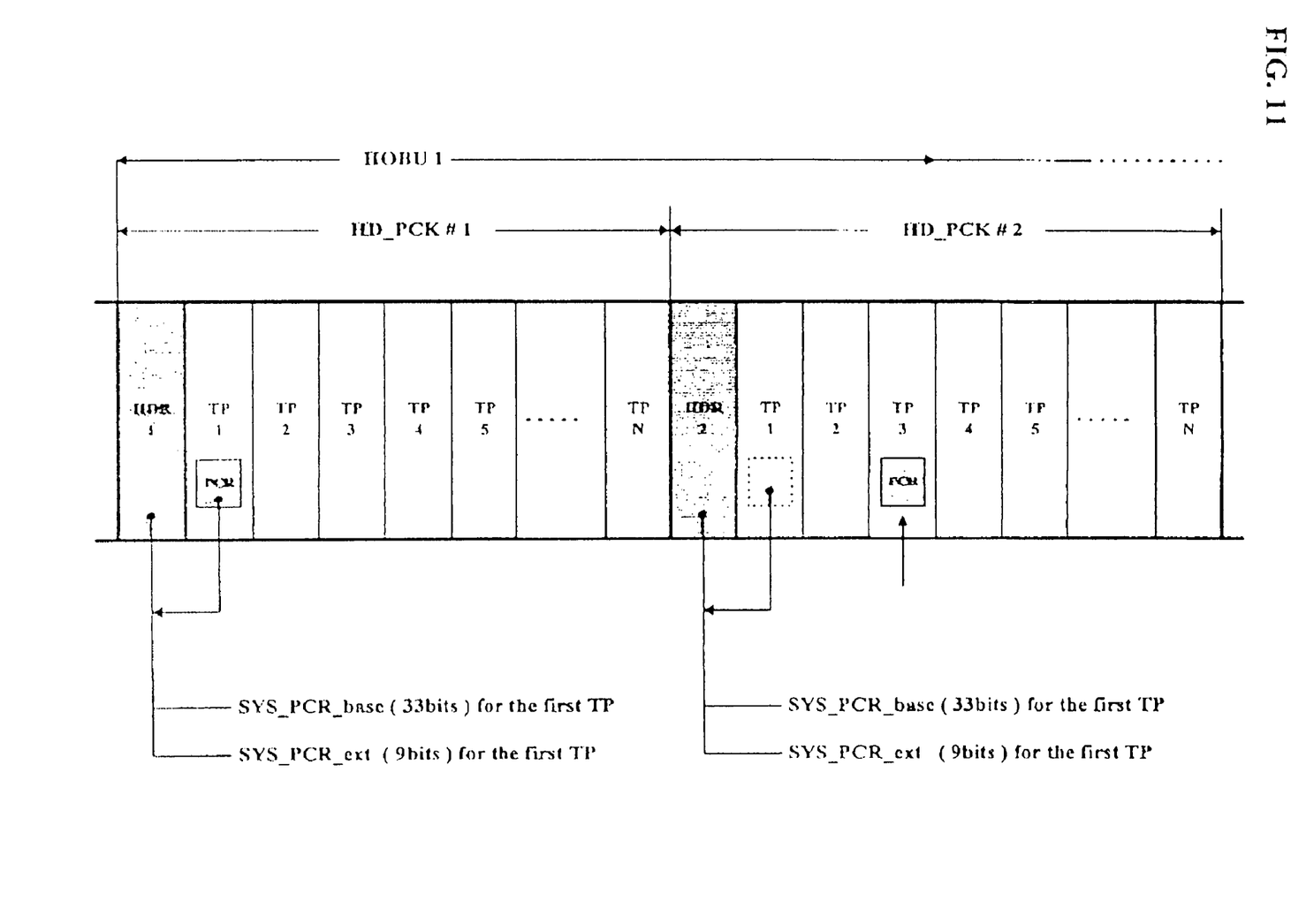
FIG. 11 is another embodiment for creating and recording transport time reference information according to the present invention.

FIG. 11 is another embodiment for creating and recording transport time reference information according to the present invention, which records the transport time reference information for the first transport packet of each pack. In this embodiment, it is not necessary to record the location information for a transport packet to be transmitted based on the recorded transport time reference information in the pack header since all transport packets related with the transport time reference information of the pack headers are fixed as the first.

If a PCR is recorded in the first transport packet, the value of the PCR is copied to and used as a transport time reference, whereas if a PCR is recorded in the third transport packet of the second pack as shown in FIG. 11, the time value of the PCR of third packet is ignored and the value for time reference to be used for the first packet is recorded in the fields of time base 'SYS_PCR_base' and time offset 'SYS_PCR_ext' as the transport time reference information.

Accordingly, when reproduction is proceeding, the controller 46 detects the transport time reference information written in fields 'SYS_PCR_base' and 'SYS_PCR_ext' of the pack header and transmits the first transport packet to the digital television 500 through applying the first packet to the TS MUX 45 at the time specified by the detected transport time reference information. For the other packets except the first one, the time differences between transport time references recorded for two first packets of consecutive packs are equally divided, then each packet except the first one is transmitted at each divided point of time.

Instead of the first packet, it is possible to designate a packet in other position, for example the last one as a reference packet corresponding to transport time reference information recorded in the pack header.

Figure 12:
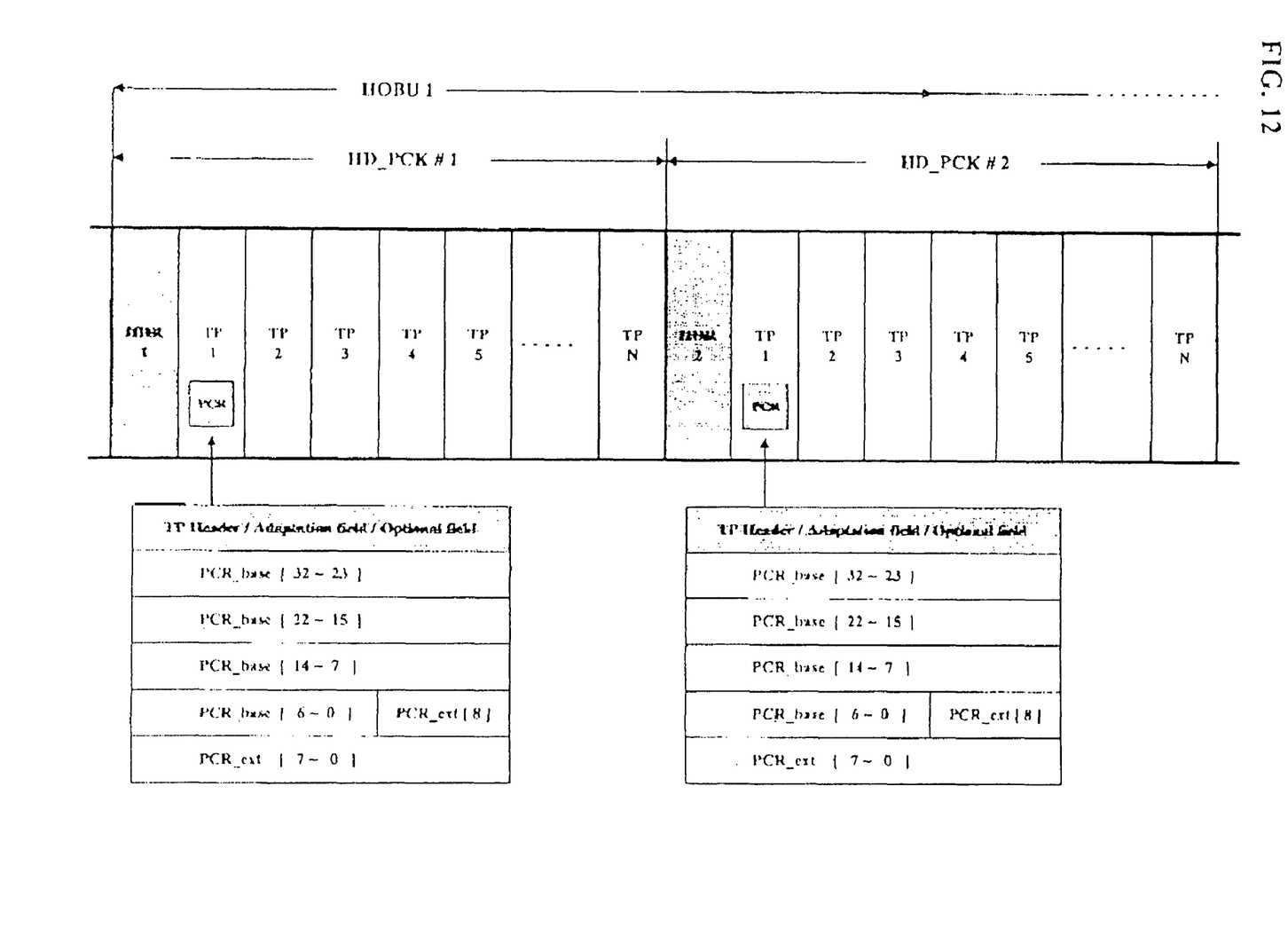
FIG. 12 is another embodiment for creating and recording transport time reference information according to the present invention.

FIG. 12 is another embodiment for creating and recording transport time reference information according to the present invention. In this embodiment, no information on the transport time reference and the packet location for a time-information-contained packet is recorded in the pack header.

Instead, a PCR is always recorded in the first transport packet of every pack when a program-recorded HDVD-ROM is manufactured. When such-manufactured HDVD-ROM is reproduced in the HDVD player 400, the controller 46 checks the header information of the first transport packet of every pack, reads out a recorded PCR, and transmits the first packet on time specified by the read PCR.

The method for creating and recording transport time reference information for a high-density disk recording medium according to the present invention can record the transport time reference information without decreasing recording efficiency too much, or use the PCR, which should be recorded in transport packets intermittently, as transport time reference information without recording additional data for a transport time reference, thereby delivering digital data recorded in a disk to an external device such as a digital TV without the deviation of transmitting-time interval between transport packets.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed:

1. An optical disc, comprising:
    a recording layer; and
    a transport stream recorded on the recording layer, the transport stream including one or more data units, each data unit including
        transport packets storing presentation data, at least one of the transport packets being a PCR packet storing a program clock reference (PCR), and
        at least one navigation transport packet being at least one lead packet of the data unit and that manages the transport packets,
    wherein the at least one lead packet does not carry presentation data and includes PCR information and PCR packet information identifying the PCR packet.

2. The optical disc of claim 1, wherein the PCR information includes base time information and extension time information.

3. The optical disc of claim 2, wherein each data unit includes at least one PCR transport packet including a PCR, the PCR packet information indicating a position of the at least one PCR transport packet.

4. The optical disc of claim 1, wherein the transport stream is an MPEG 2 transport stream.

5. The optical disc of claim 1, wherein the optical disc is a rewritable optical disk.

6. The optical disc of claim 1, wherein the at least one navigation packet includes trick play start position information and trick play end position information.

7. A method for reproducing data from an optical disc, the method comprising:
    reading a transport stream recorded on the optical disc, the transport stream including one or more data units, each data unit including
        transport packets storing presentation data, at least one of the transport packets being a PCR packet storing a program clock reference (PCR), and
        at least one navigation transport packet being at least one lead packet of the data unit and that manages the transport packets,
    wherein the at least one lead packet does not carry presentation data and includes PCR information and PCR packet information identifying the PCR packet.

8. The method of claim 7, wherein the PCR information includes base time information and extension time information.

9. The method of claim 8, further comprising:
    reading at least one PCR transport packet including a PCR included in each data unit, the PCR packet information indicating a position of the at least one PCR transport packet.

10. The method of claim 7, wherein the transport stream is an MPEG 2 transport stream.

11. The method of claim 7, wherein the at least one navigation packet includes trick play start position information and trick play end position information.

12. An apparatus for reproducing data from an optical disc, comprising:
a pickup configured to read data from the optical disc; and
a controller configured to control the pickup to read transport stream recorded on the optical disc, the transport stream including one or more data units, each data unit including
transport packets storing presentation data, at least one of the transport packets being a PCR packet storing a program clock reference (PCR), and
at least one navigation transport packet being at least one lead packet of the data unit and that manages the transport packets,
wherein the at least one lead packet does not carry presentation data and includes PCR information and PCR packet information identifying the PCR packet.

13. The apparatus of claim 12, wherein the PCR information includes base time information and extension time information.

14. The apparatus of claim 13, wherein the controller is further configured to read at least one PCR transport packet including a PCR included in each data unit, the PCR packet information indicating a position of the at least one PCR transport packet.

15. The apparatus of claim 12, wherein the transport stream is an MPEG 2 transport stream.

16. The apparatus of claim 12, wherein the at least one navigation packet includes trick play start position information and trick play end position information.

17. An apparatus for recording data on an optical disc, comprising:
a pickup configured to record data on the optical disc; and
a controller configured to control the pickup to record a transport stream on the optical disc, the transport stream including one or more data units, each data unit including
transport packets storing presentation data, at least one of the transport packets being a PCR packet storing a program clock reference (PCR), and
at least one navigation transport packet being at least one lead packet of the data unit and that manages the transport packets,
wherein the at least one lead packet does not carry presentation data and includes PCR information and PCR packet information identifying the PCR packet.

18. The apparatus of claim 17, wherein the PCR information includes base time information and extension time information.

19. The apparatus of claim 18, wherein the controller is further configured to record at least one PCR transport packet including a PCR in each data unit, the PCR packet information indicating a position of the at least one PCR transport packet.

20. The apparatus of claim 17, wherein the transport stream is an MPEG 2 transport stream.

21. The apparatus of claim 17, wherein the at least one navigation packet includes trick play start position information and trick play end position information.

* * * * *